(12) United States Patent
Bland

(10) Patent No.: US 11,648,498 B2
(45) Date of Patent: May 16, 2023

(54) FILTER FRAME ASSEMBLY

(71) Applicant: William (Rodney) Bland, Bentonville, AR (US)

(72) Inventor: William (Rodney) Bland, Bentonville, AR (US)

( * ) Notice: Subject to any disclaimer, the term of this patent is extended or adjusted under 35 U.S.C. 154(b) by 0 days.

(21) Appl. No.: 17/300,380

(22) Filed: Jun. 8, 2021

(65) Prior Publication Data

US 2022/0387919 A1 Dec. 8, 2022

(51) Int. Cl.
  *B01D 46/00* (2022.01)
  *B01D 46/12* (2022.01)

(52) U.S. Cl.
  CPC ......... *B01D 46/0005* (2013.01); *B01D 46/12* (2013.01)

(58) Field of Classification Search
  CPC ............... B01D 46/0005; B01D 46/12; B01D 46/0001; B01D 46/0002
  See application file for complete search history.

(56) References Cited

U.S. PATENT DOCUMENTS

| | | | | |
|---|---|---|---|---|
| 2,754,928 A * | 7/1956 | Hambrecht | ............ | B01D 46/10 55/491 |
| 3,345,068 A * | 10/1967 | Bowen | ...................... | A63B 5/22 273/444 |
| 4,704,144 A * | 11/1987 | LeBlanc | ............ | B01D 46/2411 55/482 |
| 4,737,174 A * | 4/1988 | Pontius | .............. | B01D 53/0407 55/491 |
| 5,230,799 A * | 7/1993 | Willard | ................... | F24F 13/28 55/495 |
| 5,421,862 A * | 6/1995 | Davis | ..................... | B01D 46/88 55/491 |
| 6,007,596 A * | 12/1999 | Rosen | ................ | B01D 46/0002 55/491 |
| 6,319,300 B1* | 11/2001 | Chen | ...................... | B01D 46/10 55/497 |
| 10,201,773 B2* | 2/2019 | Zurmuehlen | ........ | B01D 46/521 |
| 2002/0007735 A1* | 1/2002 | Volo | ...................... | B01D 46/10 55/467 |
| 2006/0168925 A1* | 8/2006 | Whittemore | ............ | F24F 13/28 55/490 |
| 2009/0233737 A1* | 9/2009 | Lerch | ................. | A63B 69/0002 473/452 |
| 2012/0317944 A1* | 12/2012 | Lise | ........................ | B01D 46/10 55/501 |
| 2013/0061567 A1* | 3/2013 | Kawasaki | ................ | B25J 21/02 55/385.2 |
| 2017/0136395 A1* | 5/2017 | Zurmuehlen | ...... | B01D 46/0005 |
| 2017/0348624 A1* | 12/2017 | Do | ..................... | B01D 46/0005 |
| 2019/0262754 A1* | 8/2019 | Barry | ..................... | B01D 46/10 |
| 2020/0139285 A1* | 5/2020 | Menken | ................ | B01D 46/10 |

* cited by examiner

*Primary Examiner* — Hung Q Nguyen
(74) *Attorney, Agent, or Firm* — Keisling & Pieper PLC; David B. Pieper; Trent C. Keisling

(57) ABSTRACT

The present disclosure relates to air filters and the frame to support the air filters. More particularly, it relates to synthetic and natural fiber filters that do not have frames. The frame assembly in this present and its special frame allows for fiber media filters to be easily connected to the frame and replaced. The frame is easily modified to fit a wide range of openings.

10 Claims, 9 Drawing Sheets

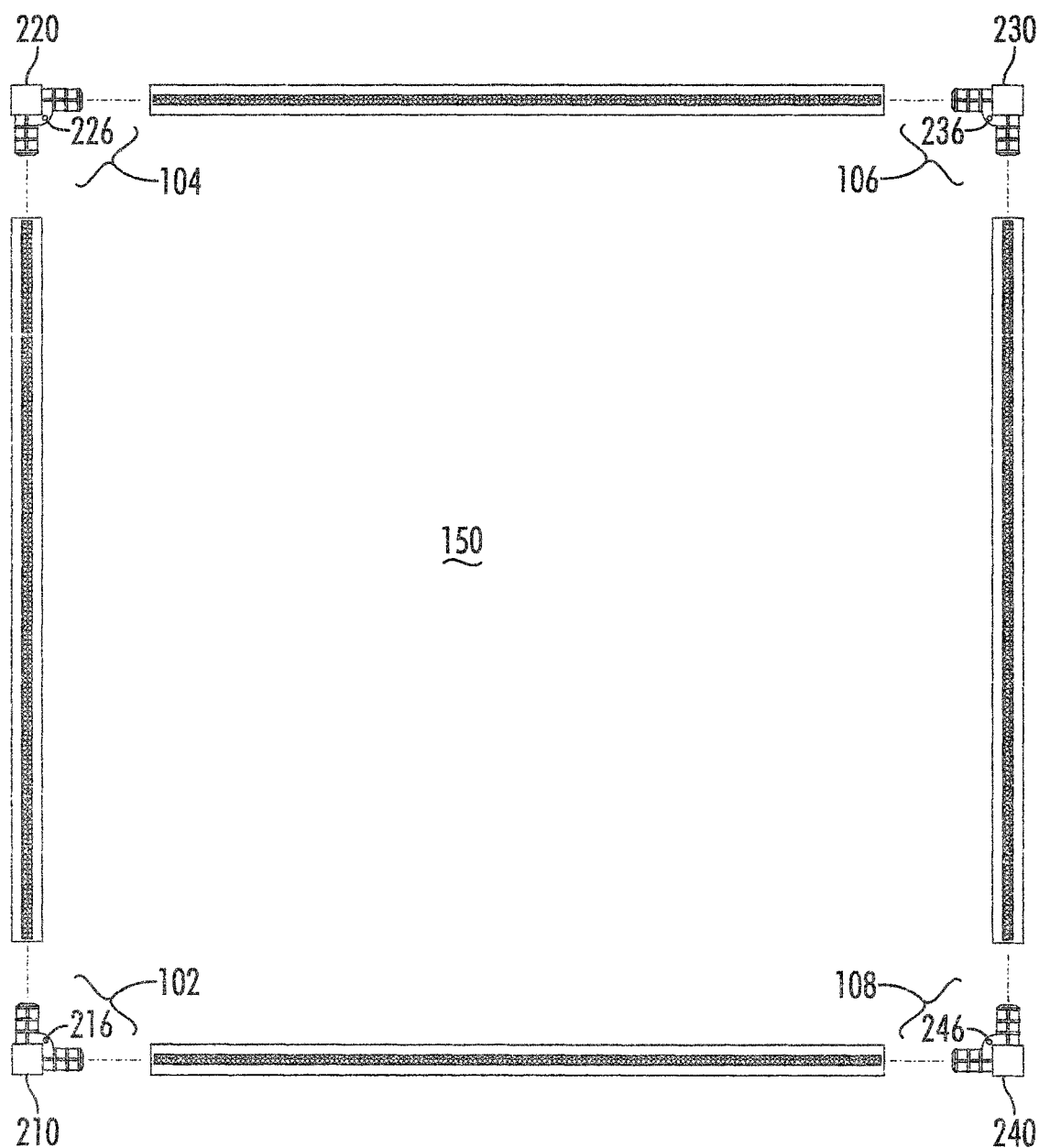
*FIG. 1E.1*

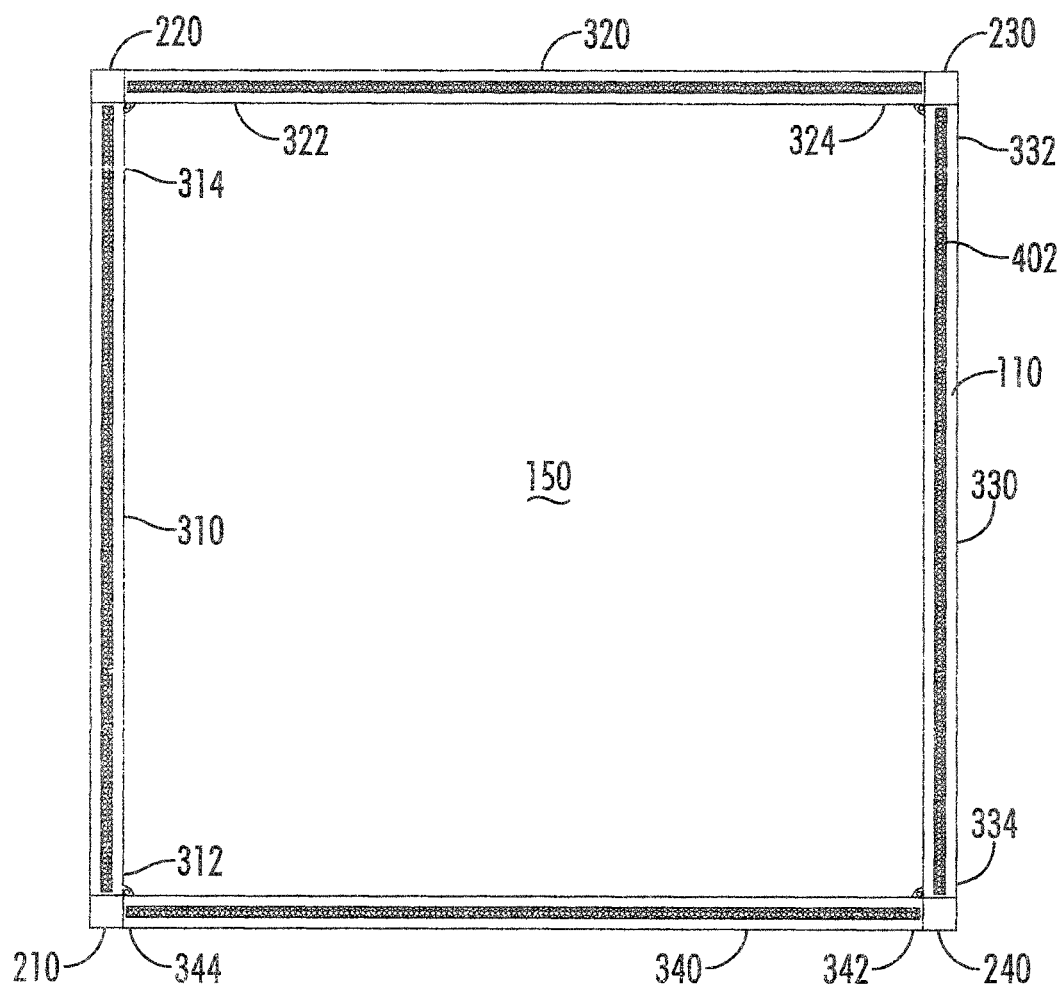
FIG. 1E.2

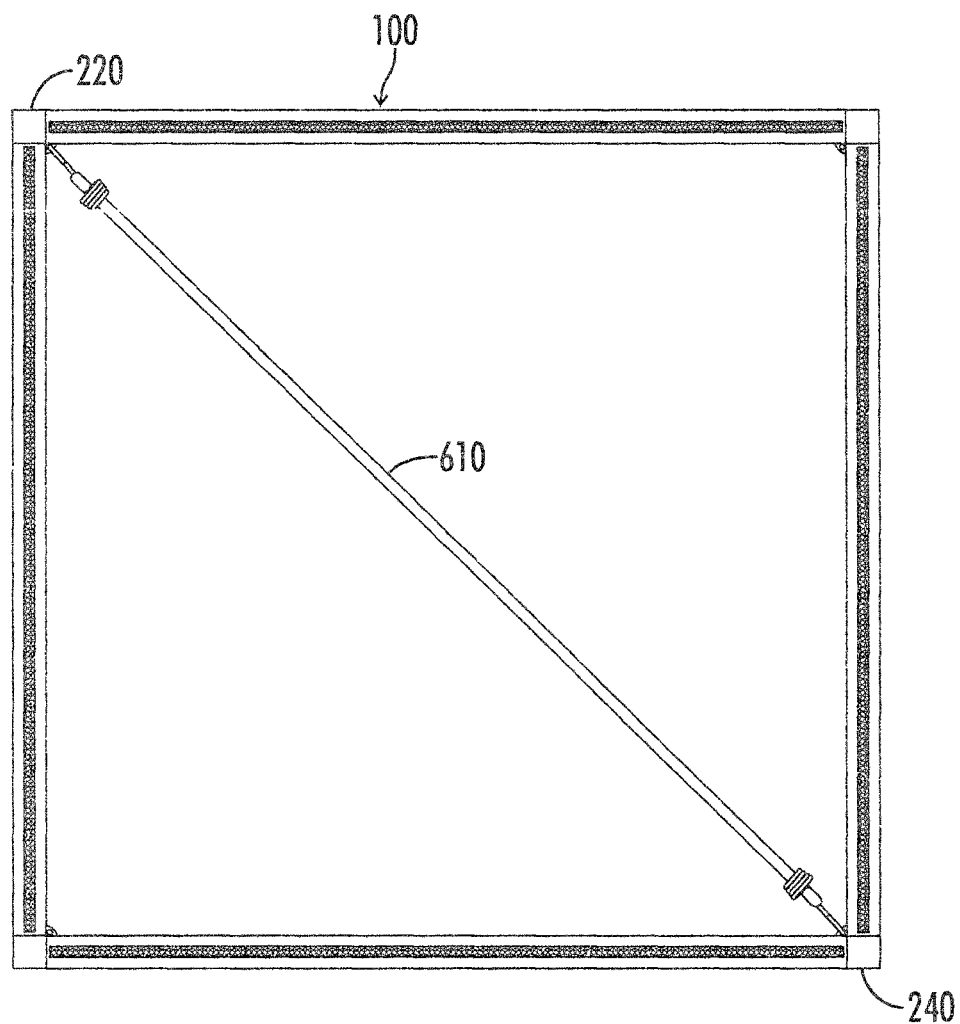
*FIG. 1E.3*

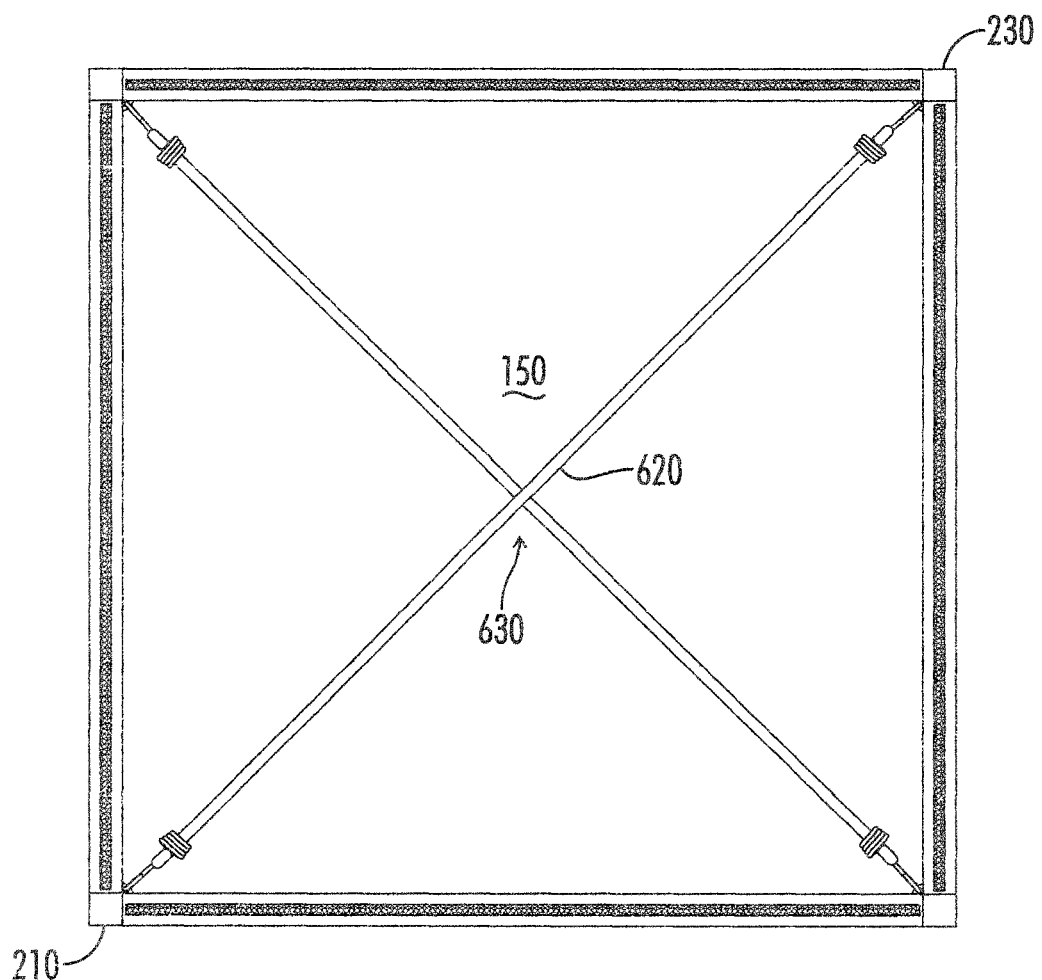
*FIG. 1E.4*

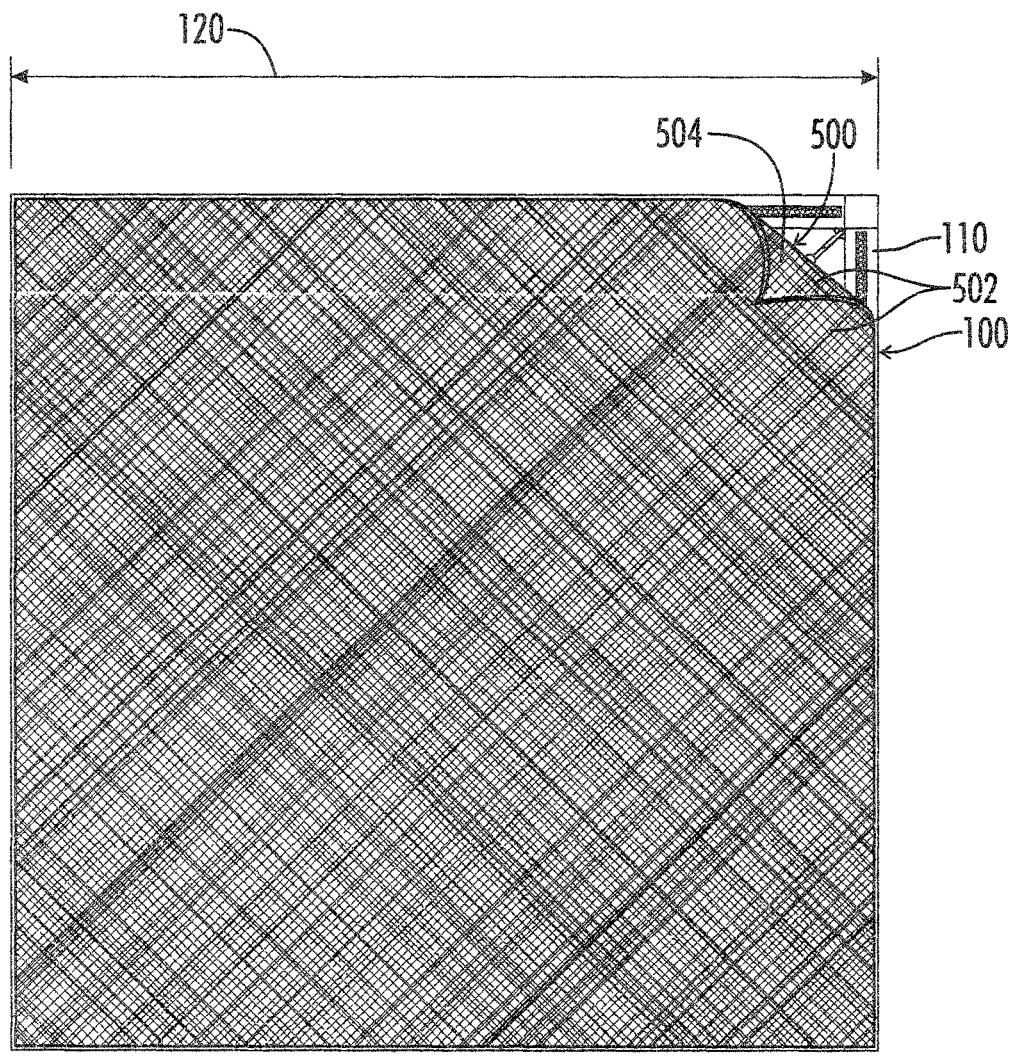
FIG. 1E.5

FILTER FRAME ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

Air filters remove dust, pollen, and other particles from the air circulating through buildings and air handling processes. Air filters are commonly located at the return air entrance to the furnace or in return air flow throughout the building and/or other air movement and management processes. Filters protect air quality and thus the air we breathe and our health. They also impact the efficiency of furnaces and other HVAC and related equipment and therefore impact energy consumption and the environment. The present invention relates to a frame assembly and more particularly a frame assembly that can be used in a range of openings to support synthetic or natural fiber filter media securely with a unique attachment feature.

2. Description of the Known Art

Prior air filters typically have fixed frames of cardboard, metal, wire, etc. These fixed frame filters take up a tremendous amount of space during transport and in storage in warehouses, home supply stores and similar. Filters are changed out on a repetitive basis due to clogging and reduced efficiency which equates to more wasted materials and resources used for these frames over time.

What has been needed is a way to supply a detached and easy to assemble frame and a mechanism to easily remove and install a replacement filter on this one time assembled frame on a repetitive basis.

SUMMARY OF THE INVENTION

The inventor of the present disclosure recognized the disadvantages of the prior type of framed filters. Given the above disadvantages, the inventor of the present recognized the need for a frame that can be shipped disassembled, easily put together and that will enable the use of a fibrous non-framed synthetic and natural fiber filter media over time for a wide range of openings. The present disclosed approach resolves issues with excessive storage utilization of framed filters because the disassembled frame in this present is a one-time shipment assembly and provides a lightweight and very strong and durable frame structure for future filters for years. This present disclosed approach eliminates the need for excessive space requirements in transportation and storage because the synthetic or natural filters can be handled and managed in a condensed and shrunk manner since they are woven and flexible and can be shipped and stored without a frame. The present disclosed approach resolves excessive material usage for frames over time and the resulting waste of materials because one frame services filters for years. The present disclosed approach resolves excessive labor used to change framed filters because the unique VELCRO(trademark) method (hook side) of filter attachment to the frame makes filter change out very easy (note: the filter is similar/same as the loop side of VELCRO(trademark)). The ease of change out of the filter with the present disclosed approach promotes filter change outs. More frequent and easier changing of the filter improves efficiency which improves better overall air quality of the air that we breathe. This ease of change-out and improved efficiency helps reduce energy consumption which helps the environment overall too.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 1E.1 is the first step in the method for assembly of the frame.

FIG. 1E.2 is the second step in the method for assembly of the frame.

FIG. 1E.3 is the third step in the method for assembly of the frame.

FIG. 1E.4 is the fourth step in the method for assembly of the frame.

FIG. 1E.5 is the fifth step in the method for assembly of the frame.

DETAILED DESCRIPTION OF THE INVENTION

Figure 1A:
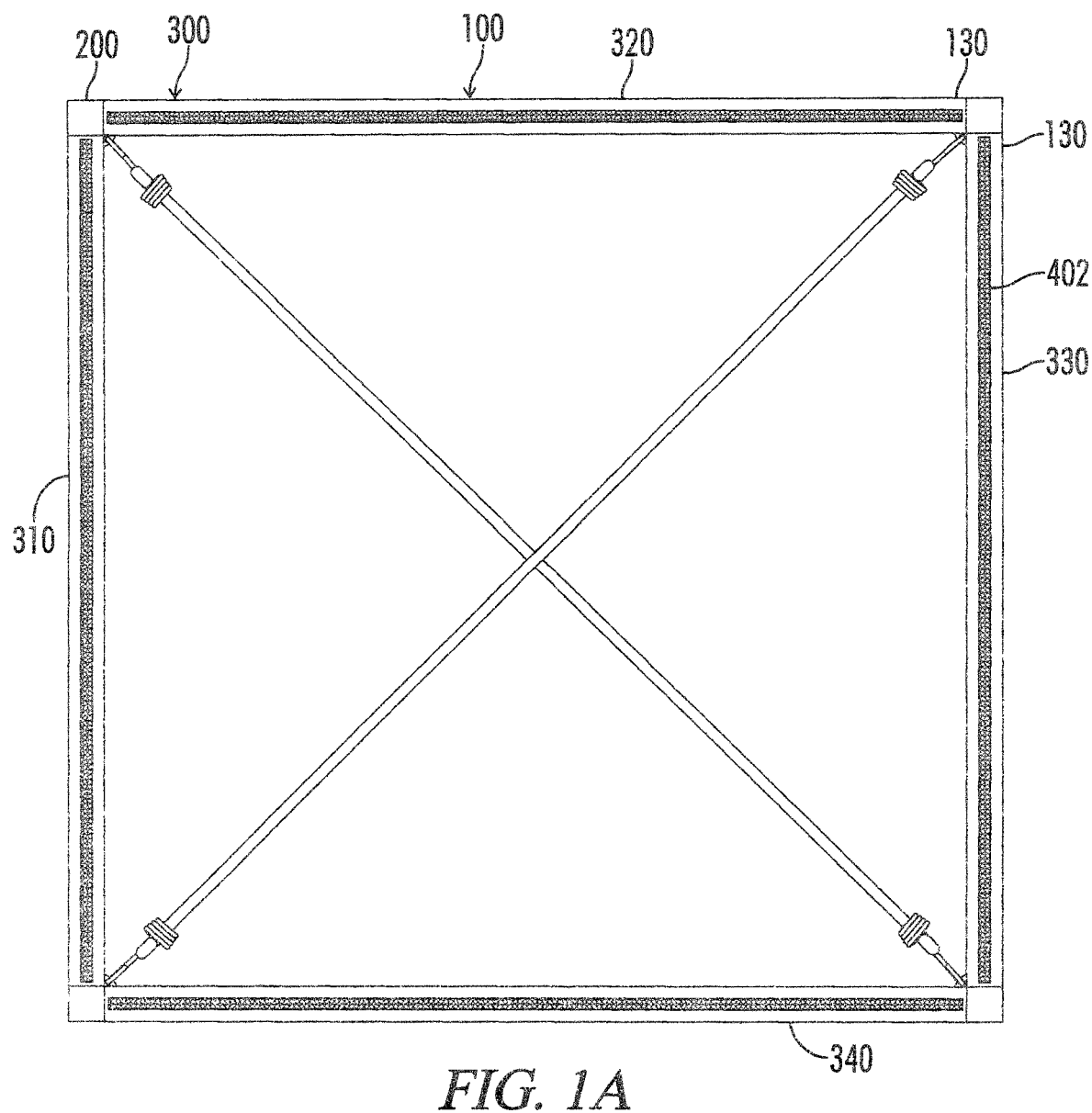
FIG. 1A is a view of the assembled frame.
Figure 1B:
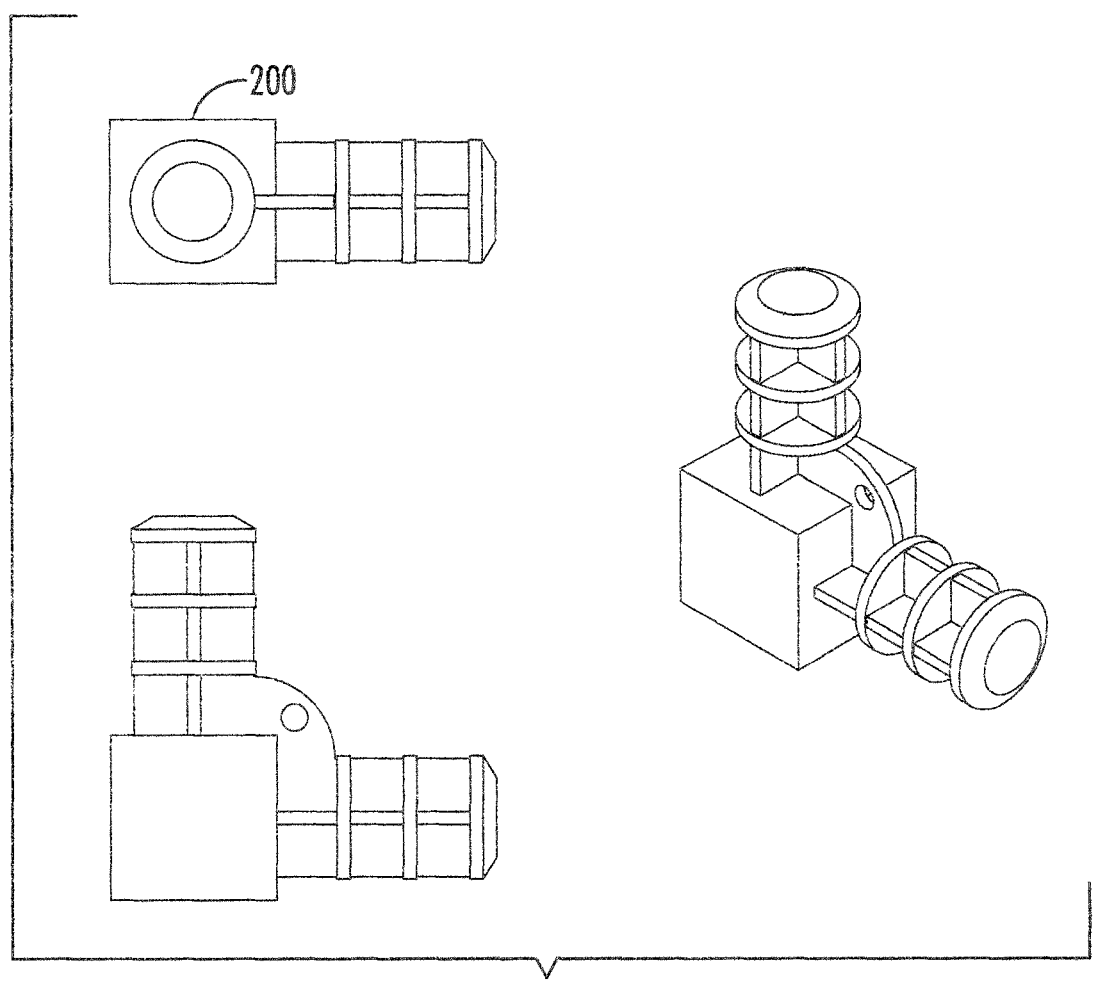
FIG. 1B is a view of the unique corner connectors for the frame assembly.
Figure 1C:
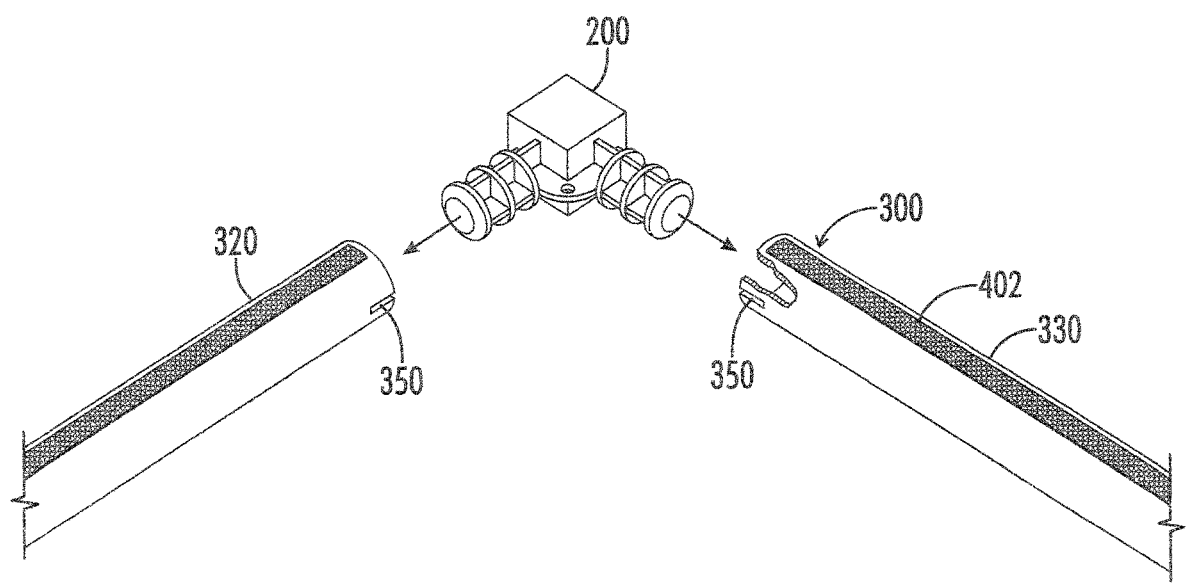
FIG. 1C is a view of the side pieces that form the outer perimeter of the frame with the hook side of a hook and loop connector for securing the fiber filter media to the frame assembly.
Figure 1D:
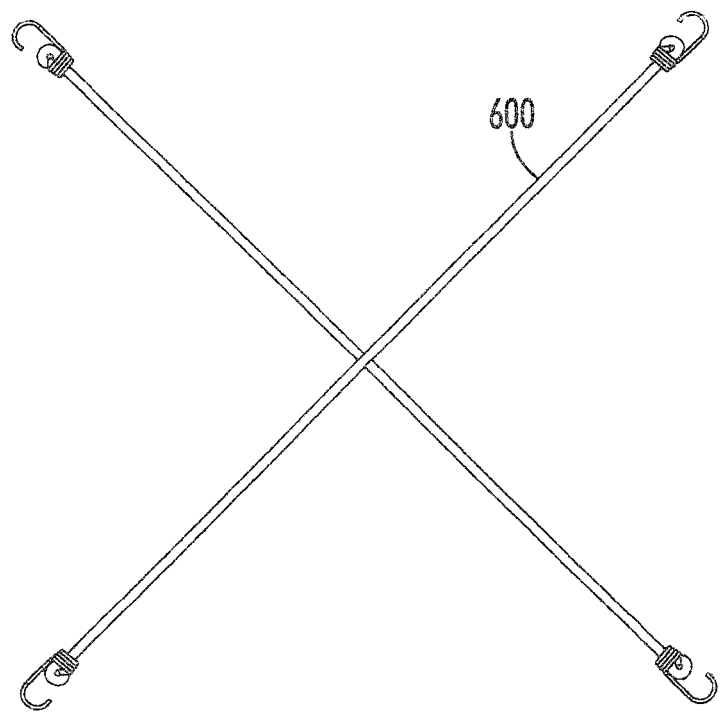
FIG. 1D is a view of the small bungee cord cross members that connect to the special frame corner connectors.

The frame assembly embodiment is represented by FIGS. 1A through 1E.5. FIG. 1A is a view of the assembled frame assembly 100. The frame 100 is square or rectangular and is fabricated from the connection of elongated side pieces 300 and special corner connectors 200 to form each side 310, 320, 330, 340 and outer perimeter 130 of the frame. FIG. 1B is a view of the unique corner connectors 200 for the frame assembly 100. FIG. 1C is a view of the side pieces 300 that form the outer perimeter 302 of the frame assembly 100 with the hook side connector 402 on these side pieces 300 for securing the fiber filter media 500 to the frame assembly 100. Note that in the embodiment shown, the hook side connector 402 can be VELCRO (Trademark of Velcro IP Holdings LLC, a Delaware Corporation having a primary address of 95 Sundial Ave. Manchester N.H. 03103. The fiber filter media 500 is a fibrous filter element attached to and supported by the frame 100 to filter air passing through the filter. The filter 500 is formed by woven strands of natural and/or synthetic fibers having different diameters. The woven strands have an irregular surface 502. The fiber filter media 500 is similar in properties to the loop side of VELCRO(trademark). FIG. 1D is a view of the small bungee cord cross members 600 that connect to the special frame corner connectors 200 of FIG. 1B to give strength to the frame 100 and the backside 504 of the attached fiber filter media 500. FIGS. 1E.1-1E.5 show the method for assembly of the frame assembly 100.

The filter frame assembly 100 is formed by the embodiment as indicated in FIGS. 1E.1-1E.5. The frame assembly 100 is put together by the following steps. As shown in FIG. 1E.1, place a corner connector 210, 220, 230, 240 at each corner 102, 104, 106, 108 of an imaginary square 150 approximate size of your opening. The corner connectors 210, 220, 230, 240 are made of plastic.

As shown in FIG. 1E.2, take the side pieces 300 and connect them to the corner pieces 200 to form the square 150. Each elongated side pieces 310, 320, 330, 340 of the square 150 or rectangular frame 100 has the hook side connector 402 secured to it. Each elongated side piece 310, 320, 330, 340 has a slot 350 on each end 312, 314, 322, 324, 332, 334, 342, 344 to slide over the gusset 216, 226, 236, 246 part of the corner connector piece 210, 220, 230, 240 to keep the frame 100 from twisting. NOTE: ensuring that the hook side connector 402 is on the top side 110 facing you.

As shown in FIG. 1E.3, connect the top left corner piece 220 of the frame 100 to the bottom right corner piece 240 of the frame 100 with the supplied first bungee cord 610.

As shown in FIG. 1E.4, then connect the top right corner pieces 230 of the frame 100 to the bottom left corner piece 210 of the frame 100 with the second bungee cord 620. The bungee cords 610, 620 should form an 'X' 630 within the square frame 100. In this manner, the top corner connectors 220, 230 are connected and secure to the opposite bottom corner connectors 210, 240 by bungee cords 610, 620 to give the frame 100 stability and support to the central part of the filter 500 in the middle part 140 of the frame assembly 100.

Lay the pre-cut to dimension 120 fiber filter pad 500 on the top side 110 of the square 150 frame 100 and the filter pad 500, which is similar to the loop side of VELCRO (trademark) and thus becomes the loop side connector 404, will attach to the hook side connector 402 of the frame 100 and secure the filter 500 in place.

Place the filter frame 100 with attached filter 500 into its location in the air handling unit or process. NOTE: the next time the filter needs to be changed, just pull the filter 500 from the frame 100 and reattach a new filter 500.

Reference numerals used throughout the detailed description and the drawings correspond to the following elements:
frame assembly 100
first corner 102
second corner 104
third corner 106
fourth corner 108
frame top side 110
frame dimension 120
frame perimeter 130
middle part 140
square 150
corner connectors 200
bottom left corner piece 210
bottom left gusset 212
top left corner piece 220
bottom right gusset 222
top right corner piece 230
top right gusset 232
bottom right corner piece 240
bottom right gusset 242
side pieces 300
outer perimeter 302
left side piece 310
first left end 312
second left end 314
top side piece 320
first top end 322
second top end 324
right side piece 330
first right end 332
second right end 334
bottom side piece 340
first bottom end 342
second bottom end 344
slot 350
hook and loop connector 400
hook side connector 402
fiber filter media 500
irregular surface 502
filter backside 504
cord cross members 600
first cord cross member 610
second cord cross member 620
X shape 630

What is claimed is:

1. An air filter comprising:
    a frame defining a frame periphery including a first elongated side piece and a second elongated side piece connected by a first corner connector,
    the first elongated side piece includes a first top side with a first hook side connector and the second elongated side piece includes a second top side with a second hook side connector;
    the first elongated side piece including a first end defining a first slot;
    the first corner connector including a gusset part, the gusset part engaging the first slot; and
    a fibrous filter element sized to the frame periphery and attached to the hook side connectors on the first top side and the second top side and supported by the frame.

2. The filter of claim 1, wherein the filter is formed by woven strands of natural and/or synthetic fibers having different diameters.

3. The filter of claim 2, wherein the woven strands have an irregular surface.

4. The filter of claim 1, wherein the frame includes a third elongated side piece connected to the second elongated side piece by a second corner connector,
    a fourth elongated side piece connected to the third elongated side piece by a third corner connector, and
    the fourth elongated side piece connected to the first elongated side piece by a fourth corner connector.

5. The filter of claim 4, wherein the third elongated side piece including a third top side with a third hook side connector, and the fourth elongated side piece including a fourth top side with a fourth hook side connector.

6. The filter of claim 4, wherein the frame is a square shape.

7. The filter of claim 4, wherein the first and third corner connectors are connected by a bungee cord.

8. The filter of claim 5, wherein the filter is formed by woven strands of natural and/or synthetic fibers having different diameters and the filter is connected to the third hook side connector and the fourth hook side connector.

9. An air filter apparatus kit, comprising:
- a frame including sides and at least two opposed corner connectors,
- the opposed corner connectors elastically connected by a bungee cord; and
- a fibrous filter element supported by the frame and the bungee cord.

10. An air filter apparatus kit, comprising:
- a frame including a frame filter top, first elongated side piece and second elongated side piece and a corner connector,
- the first elongated side piece includes a first end with a first slot and first top side with a first hook side connector and a second elongated side piece includes a second end with a second slot and a second top side with a second hook side connector;
- the first corner connector including a gusset part, the gusset part engaging the first slot and the second slot to align the first hook side connector and the second hook side connector on the frame filter top.

\* \* \* \* \*